United States Patent
Wu et al.

(10) Patent No.: US 7,140,762 B2
(45) Date of Patent: Nov. 28, 2006

(54) LINEAR LIGHT SOURCE FOR ENHANCING UNIFORMITY OF BEAMING LIGHT WITHIN THE BEAMING LIGHT'S EFFECTIVE FOCAL RANGE

(75) Inventors: Rong-Yaw Wu, Hsin Tien (TW); Chih-Ming Yen, Taipei (TW); Shih-Che Chen, Sanchong (TW)

(73) Assignee: Pixon Technologies Corp., Taipei Hsien (TW)

(*) Notice: Subject to any disclaimer, the term of this patent is extended or adjusted under 35 U.S.C. 154(b) by 227 days.

(21) Appl. No.: 10/857,873

(22) Filed: Jun. 2, 2004

(65) Prior Publication Data

US 2005/0180159 A1 Aug. 18, 2005

(30) Foreign Application Priority Data

Feb. 17, 2004 (TW) ............................... 93103690 A (51) Int. Cl.
*F21V 8/00* (2006.01)
(52) U.S. Cl. ...................... 362/610; 362/26; 362/555; 362/327
(58) Field of Classification Search .................. 362/26, 362/27, 555, 558, 560, 327, 551, 800, 609, 362/610, 612
See application file for complete search history.

(56) References Cited

U.S. PATENT DOCUMENTS

| 6,565,225 | B1* | 5/2003 | Mabuchi et al. | ............ 362/610 |
| 6,783,269 | B1* | 8/2004 | Pashley et al. | ............ 362/555 |
| 6,786,626 | B1* | 9/2004 | Wu et al. | .................... 362/555 |
| 2005/0047109 | A1* | 3/2005 | Yi et al. | ....................... 362/26 |

* cited by examiner

*Primary Examiner*—Sandra O'Shea
*Assistant Examiner*—Peggy A. Neils
(74) *Attorney, Agent, or Firm*—Rosenberg, Klein & Lee (57) ABSTRACT

A light guide assembly as a linear light source for enhancing the uniformity of beaming light within the beaming light's effective focal range comprising a light guide bar connected to a light source assembly and a reflective housing encasing the light guide bar. One surface of the light guide bar is a light-scattering/light-emission surface, and other surfaces are all reflective. The emission plane has gradually changing indentations for adjusting the light refractive and reflecting indexes to ensure the light uniformity. The reflective housing covering the light guide bar is used for enhancing the light reflection and intensity. An opening is formed in the reflective housing corresponding to the emission plane of the light guide bar, and a reflecting flange is formed at one side of the opening. Combined with the sloping and notched emission plane, light with high intensity and uniformity can be obtained, and the uniformity of beaming light within the beaming light's effective focal range can also be improved.

19 Claims, 11 Drawing Sheets

FIG.1

(Prior Art)

LINEAR LIGHT SOURCE FOR ENHANCING UNIFORMITY OF BEAMING LIGHT WITHIN THE BEAMING LIGHT'S EFFECTIVE FOCAL RANGE

BACKGROUND OF INVENTION

1. Field of the Invention

The invention relates to a linear light source, and more particularly, to a linear light source having a light guide bar with a sloped and notched light emitting surface and an external reflective housing, which enhances uniformity of beaming light within the beaming light's effective focal range in addition to the overall improvements on light intensity and uniformity.

2. Description of the Prior Art

Scanners, facsimile machines and multifunction peripherals are popularly used in daily life. This type of equipment generally utilizes a linear light source to illuminate the target. Imaging quality of the scanned target is greatly related to the performance of the light source. If the intensity or uniformity of the light source is patchy, the output picture will not be accurate. Under certain circumstances, if the scanned target is not in a fixed focal range and exceeds the effective focal range tolerance of the light source, the output picture will be indistinct. Hence, the light source of the present invention with the overall intensity and uniformity improvements and in particular the uniformity of beaming light within beaming light's effective focal range enhancement has been developed.

Figure 1:
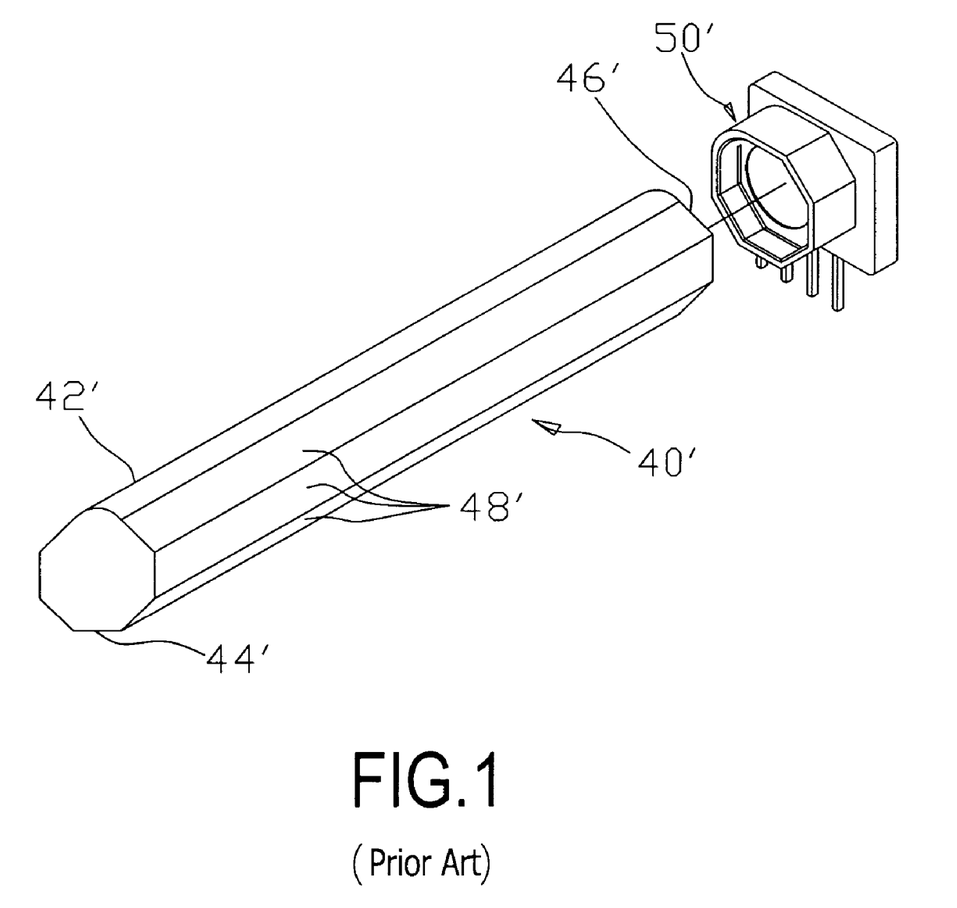
FIG. 1 is a 3-dimentional diagram of a prior art linear light source.

Conventional linear light sources are generally cylindrical, square or rectangular. These designs are easier to be molded or fabricated, but the efficiency of light propagation in terms of diffusion and scattering or uniformity control is limited. As a result, many different inventions have been disclosed to resolve these problems. For giving consideration to linear light source designs having a symmetrical polygonal cylinder, the applicant has previously developed a linear light source having a reflecting plane. As shown in FIG. 1, the light source comprises a light guide bar 40' and a light source component 50'. The light guide bar 40' is a polygonal cylinder, and includes an arced emission plane 42', a reflecting plane 44' corresponding to the arced emission plane 42', an incidence plane 46'and a plurality of reflecting sides 48'. With this kind of design, the light guide bar 40' can yield uniformed light with the reflecting plane 44' after directing the light from the light emitting diode on the light source component 50'. Also, the condensing effect of the arced emission plane 42' can lead to better light output and enhance the image detecting quality.

The above-mentioned prior art utilizes the plane treatment of the light guide bar to improve the light uniformity, and changes the structure of the light guide bar to improve the condensing effect and light intensity. Although the prior art provides acceptable results, greater improvements are still sought after to optimize the energy conservation, improve the intensity and uniformity of the emitted light, and enhance the uniformity of beaming light within beaming light's effective focal range. Hence, the present invention discloses a linear light source having a sloped and notched light-emitting surface and an external reflective housing which enhances uniformity of beaming light within the beaming light's effective focal range. The reflecting housing with reflecting flange efficiently guides the light and reduces the energy loss with repetitive diffusion and scattering, thus further enhancing the light intensity.

SUMMARY OF INVENTION

It is therefore an objective to provide a linear light source that can be applied to the target in order to improve the definition and accuracy of scanning.

It is therefore another objective to provide a linear light source for enhancing the uniformity of beaming light within the beaming light's effective focal range.

It is therefore a further objective to provide a linear light source with greater emitted or beaming light uniformity that can accurately detect the target without loss caused by uneven or non-uniform intensity.

It is therefore a further objective to provide a linear light source with high intensity that can repeatedly reflect light in order to optimally conserve the light energy and greatly enhance the intensity.

The present invention discloses a light guide assembly with improved intensity, uniformity and enhanced uniformity of beaming light within effective beaming light focal range. The light guide assembly comprises a light guide bar that connects to a light source assembly. The light source assembly comprises, for example, a single LED or plurality of LEDs in an LED package. The light source is positioned adjacent to a light-receiving end of the light guide bar. The light guide bar is encased in a reflective housing such as a reflective sleeve or reflective windowed box. One surface of the light guide bar is a light-scattering/light-emission surface where the light exits.

The reflective housing surrounds all surfaces except for the light-scattering/light-emission surface. The reflective housing may be a windowed box wherein the light guide bar is enclosed in the box except for the light-emitting surface, which emits light through the opening or window of the box. The surfaces of the light guide bar surrounded by the reflective housing are reflective surfaces for reflecting light.

After light from the light source assembly enters the light-receiving end or ends of the light guide bar, the light may be reflected off any of the reflective surfaces. The light eventually exits the light guide bar through the light-scattering/light-emission surface. The light-scattering/light-emission surface further comprises a light-scattering pattern that serves to diffuse the light. The light-scattering pattern can comprise a series of notches and/or ridges that are formed such that they vary along the length of the light guide body and may be slightly ramped or sloped from a side view.

As mentioned above, the light-scattering pattern diffuses the light since the light is reflected by one or more of the notches or ridges. The light continues to propagate through the light guide bar from the light-receiving end toward the opposite end before exiting the surface either through a notch or ridge. The light exiting the light-scattering/light-emission surface also refracts at a variety of different angles through the various notches and ridges.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a light guide assembly with improved emitted light intensity and uniformity and with improved uniformity of beaming light within the beaming light's effective focal range.

Figure 2:
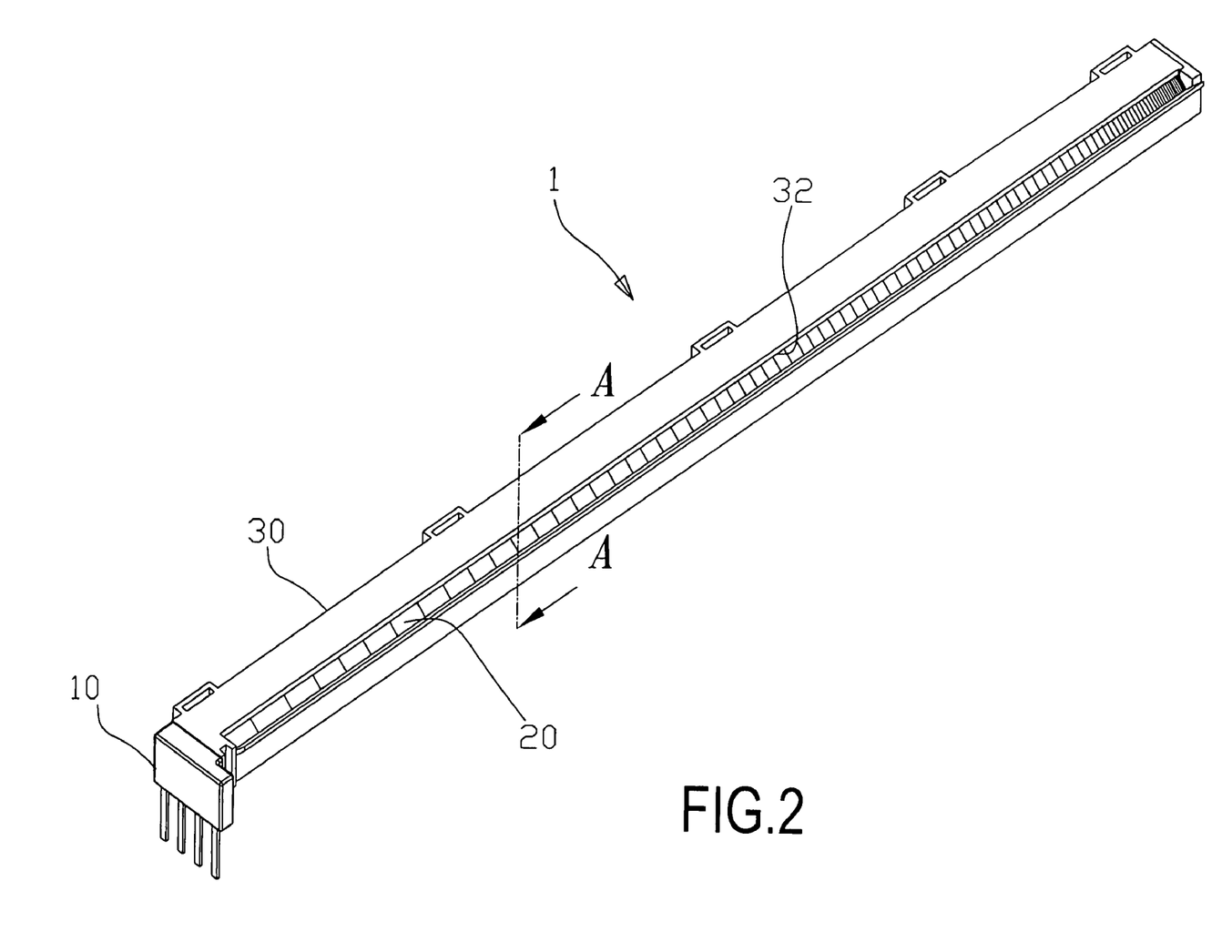
FIG. 2 is a 3-dimentional diagram of a light guide assembly according to an embodiment of the present invention.

Refer to FIG. 2, which is a 3-dimentional diagram of a light guide assembly according to an embodiment of the present invention.

As shown in FIG. 2, the light guide assembly 1 comprises a light source assembly 10, a light guide bar 20 and a reflecting sleeve 30 surrounding the light guide body 20. Light from the light guide bar 20 is emitted through an emission opening 32 in the reflecting sleeve 30.

Figure 3:
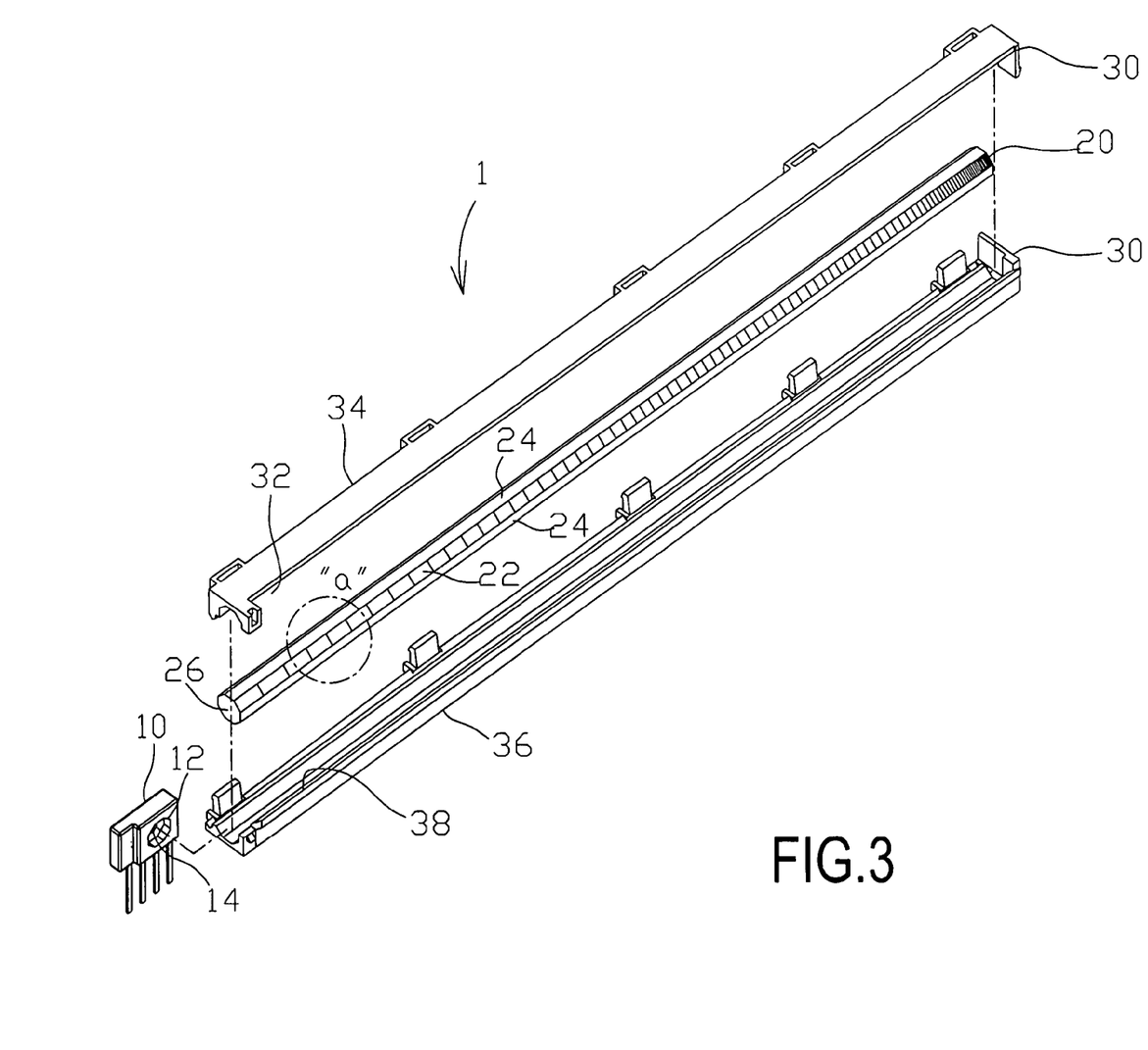
FIG. 3 is an exploded view of a light guide assembly according to an embodiment of the present invention.

Also refer to FIG. 3, which is an exploded view of a light guide assembly according to an embodiment of the present invention.

The light source assembly 10 of the light guide assembly 1 comprises an opening 12 which corresponds in shape to the shape of the light guide bar 20. The light guide bar 20 is received in the opening 12 and allows the light guide bar 20 to firmly connect to the light source 10. At least one light emitting diode (LED) 14 is installed in the opening 12 of the light source assembly 10 as the light source origin. The light guide bar 20 is a symmetrical polygonal cylinder and is illustrated as an octagonal cylinder in this embodiment. However, the number of sides of the light guide body can be chosen as desired. The light guide bar 20 is primarily used for converting the spot light source of the LED 14 into a linear light source. One surface of the light guide bar 20 is a light-scattering/light-emission surface 22 for linearly emitting the light. The other surfaces are reflecting surfaces 24 used for reflecting the light. One end of the light guide bar 20 is a light-receiving end 26. When the light source assembly 10 and the light guide bar 20 are assembled together, the light-receiving end 26 corresponds to the LED 14 of the light source assembly 10, so that the light from the LED 14 passes into the light guide bar 20 via the light-receiving end 26 and is distributed through the structure of the light guide bar 20.

Furthermore, the reflective sleeve 30 covers the light guide bar 20 thereby enhancing the reflection effect and improves the output intensity. An emission opening 32 is formed in the reflective sleeve 30 corresponding to the light-scattering/light-emission surface 22 of the light guide bar 20 for allowing the light to pass. The other surfaces are reflective surfaces 24 and are covered by the reflective sleeve 30. After entering the light guide bar 20, the light is reflected by the reflective surfaces 24 and the reflective sleeve 30 in order to enhance the intensity. After being reflected the light will be emitted through the emission opening 32 from the light-scattering/light-emission surface 22. In the design, the reflective sleeve 30 can further comprise an upper section 34 and a lower section 36. The light guide bar 20 is placed between the upper section 34 and the lower section 36, and with the combination of the upper and lower sections 34, 36, the light guide bar 20 will be encased in the reflective sleeve 30. Since the primary function of the reflective sleeve 30 is to reflect the light, the color of the reflective sleeve 30 can be selected from those having greater reflectivity, such as white, silver, or silvery white.

Figure 4A:
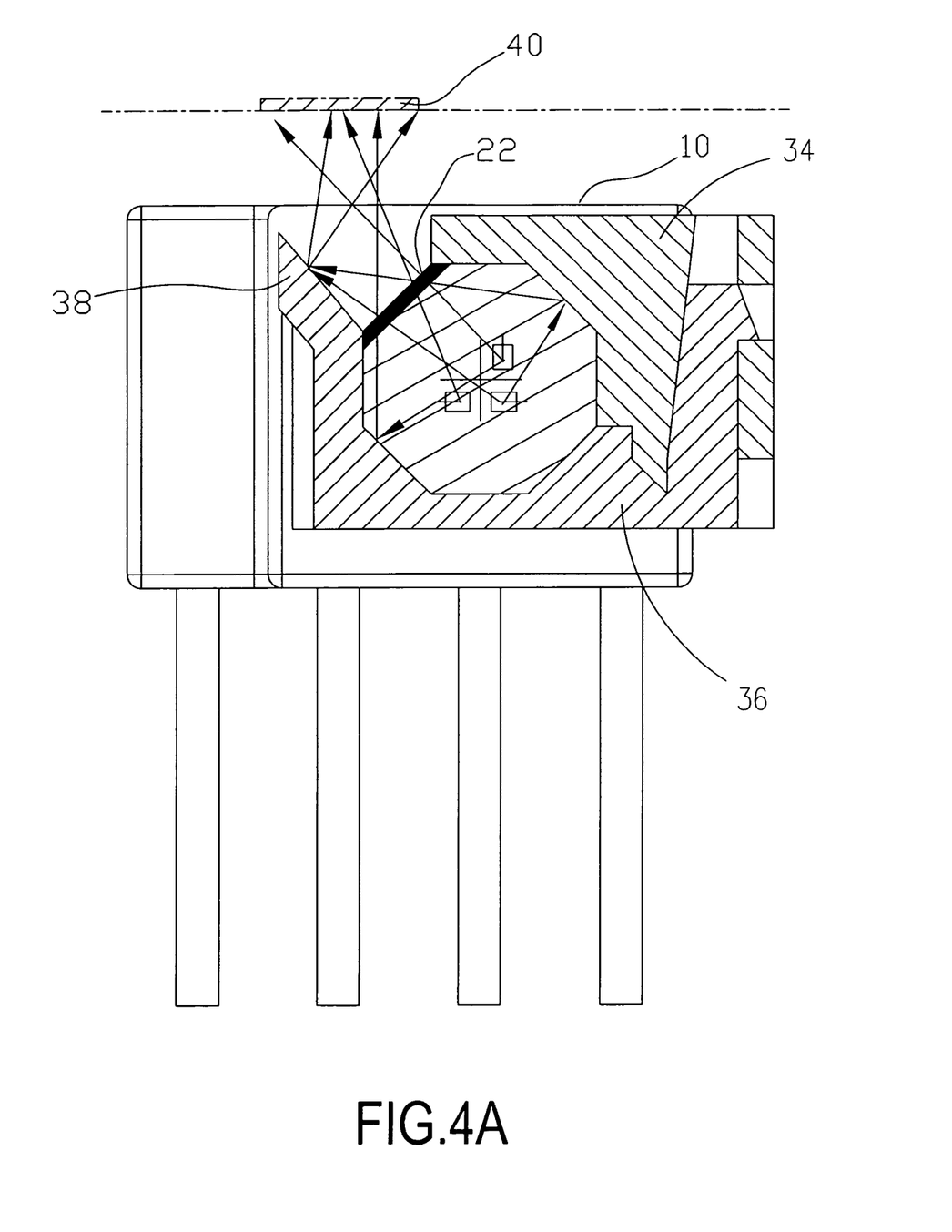
FIG. 4A is a cross-sectional view of a light guide assembly according to an embodiment of the present invention.

Refer to FIG. 4A, which is a cross-sectional view of a light guide assembly according to an embodiment of the present invention.

For enhancing the reflection effect, a reflecting flange 38 is located on the lower section 36 at one side of the emission opening 32. The angle between the reflecting flange 38 and the vertical axis of the emission opening 32 is typically about 30 to 60 degrees. However the angle, length, and width of the reflecting flange 38 can be modified according to requirements. Because the emission angle of the light output by the light guide bar 20 via the light-scattering/light-emission surface 22 is in a wide range and not directed toward the target 40, the reflecting flange 38 can reflect and redirect the light once again.

The addition of the reflective flange 38 further aids in concentrating the light, optimally conserving the light energy, and improving the output intensity and overall uniformity.

Figure 4B:
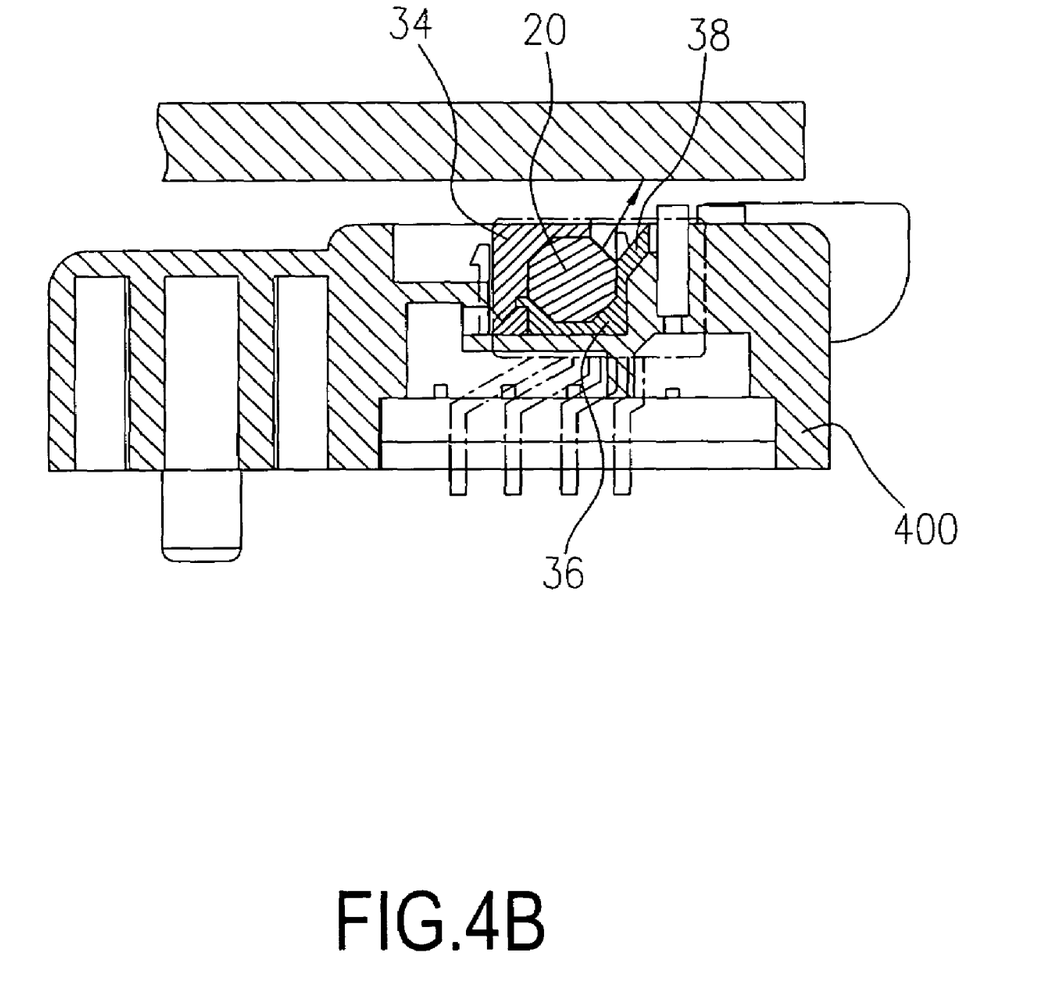
FIG. 4B is a cross-sectional view of a light guide assembly according to an embodiment of the present invention.

Refer to FIG. 4B, which is a cross-sectional view of a light guide assembly according to an embodiment of the present invention.

In some embodiments, the reflecting housing comprises a one piece or two piece reflecting sleeve 34, 36. In application, after the light guide bar 20, light source assembly, and reflecting sleeve 34, 36 are assembled, the light guide assembly is mounted in a larger mounting base 400.

Figure 4C:
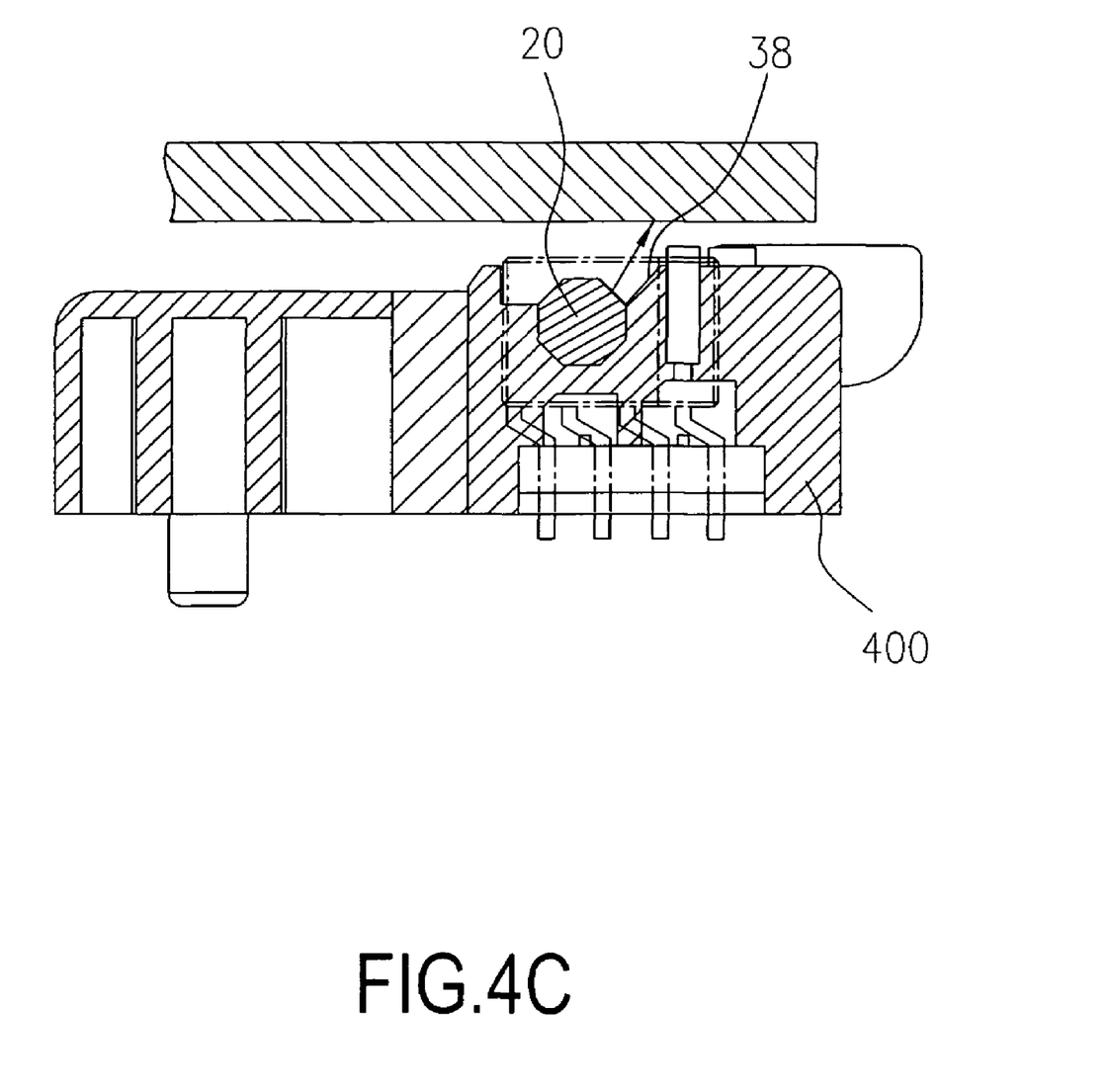
FIG. 4C is a cross-sectional view of a light guide assembly according to an embodiment of the present invention.
Figure 4D:
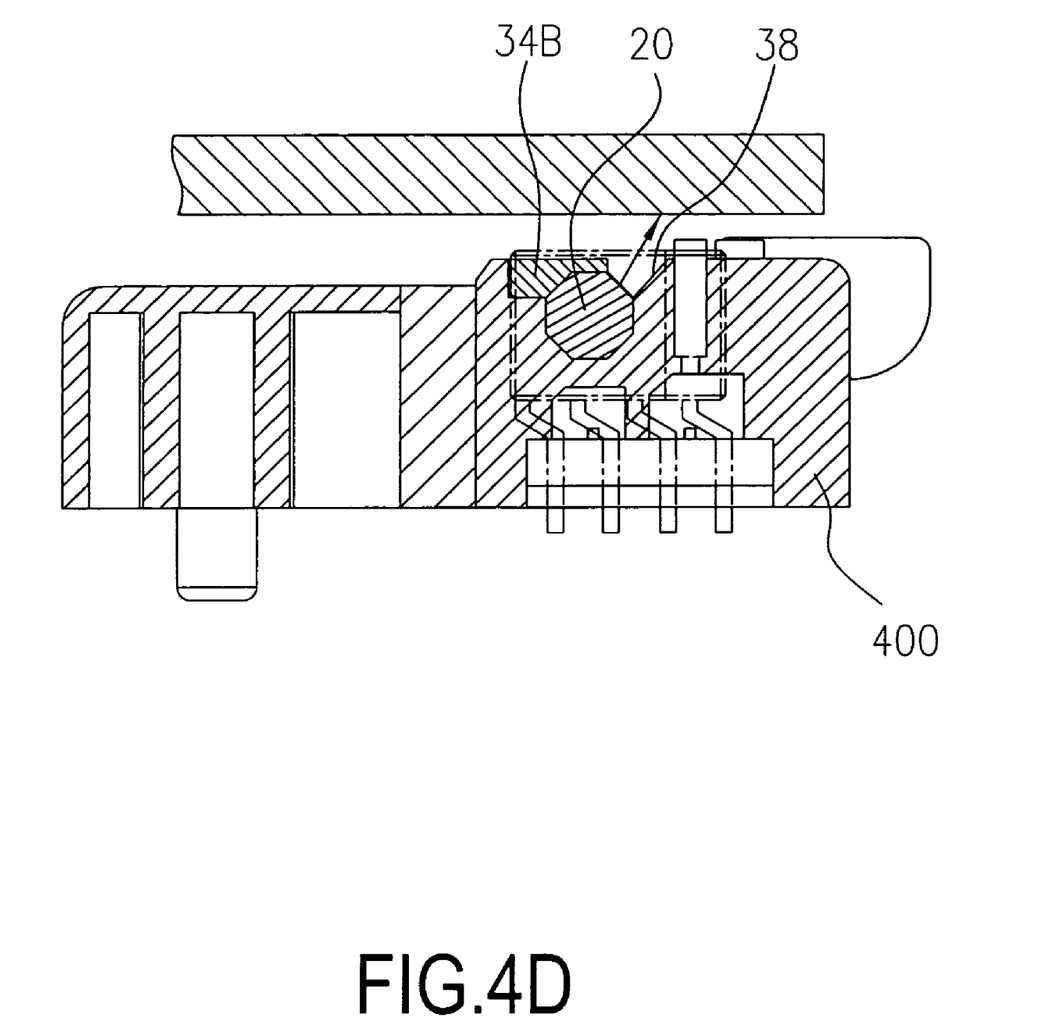
FIG. 4D is a cross-sectional view of a light guide assembly according to an embodiment of the present invention.

Refer to FIG. 4C and FIG. 4D, which are cross-sectional views of a light guide assembly according to an embodiment of the present invention.

In other embodiments such as illustrated in 4C, the larger mounting base is made of a reflective material such as white, silver, or white-silver material. In this way, the larger mounting base becomes the reflecting housing 400. The light guide bar 20 and the light source assembly are mounted into the reflecting housing 400 without the need for also assembling a separate reflective sleeve. This eliminates production steps and lowers production costs.

Figure 5:
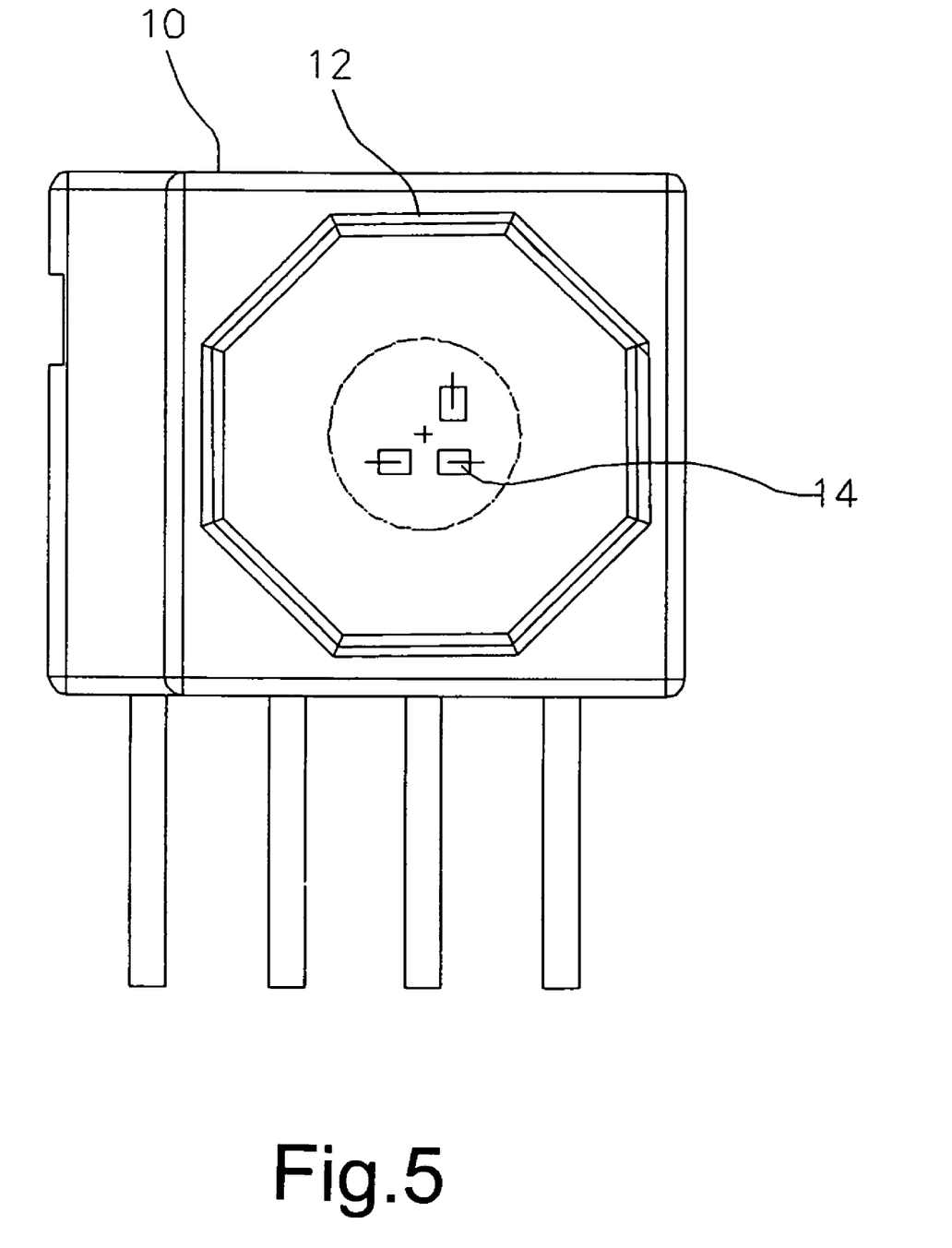
FIG. 5 is a front view of a light source of a light guide assembly according to an embodiment of the present invention.

Additionally as shown in FIG. 4D, a reflecting housing top section 34B can be optionally installed on top of the reflecting housing 400 after the light guide bar 20 is installed. This further adds to the reflective function of the reflecting housing 400. Refer to FIG. 5, which is a front view of a light source assembly of a light guide assembly according to an embodiment of the present invention.

The LED 14 can be selected from a red LED, blue LED or green LED, other color of LED in accordance with the user's requirement. When requiring a monochromatic light source, only one color of LED needs to be placed in the base of the light source assembly 10, and when requiring a color light source, at least one red, at least one blue, and at least one green LED each are installed. In this example, three LEDs are utilized. However, any number of, color of, or combination of LEDs can be utilized or configured as required.

However, due to the different color and different wavelength of the LEDs, the LEDs 14 are installed at a position approximately 1.12±0.1 centimeters in a diametrical range outward from the center of the opening 12. Furthermore, the distance from the center or positioning of the LEDs can be modified to meet requirements. When the light guide bar 20 and the opening 12 are securely connected, the light of each LED can concentratively enter the light guide bar with a reduced invalid reflecting region.

Figure 6:
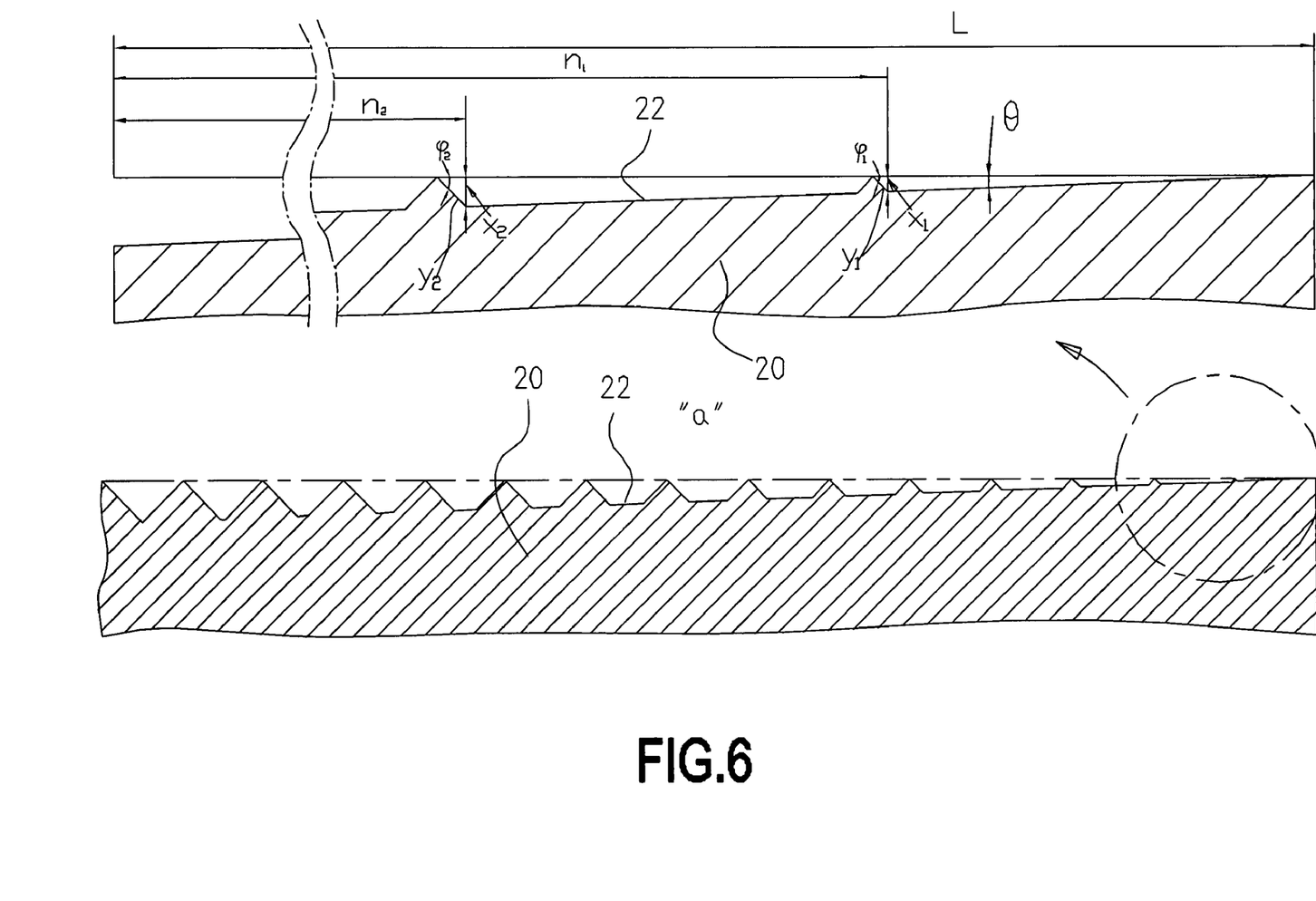
FIG. 6 is a side view of a light-scattering pattern of a light-scattering/light-emission surface according to an embodiment of the present invention.
Figure 7:
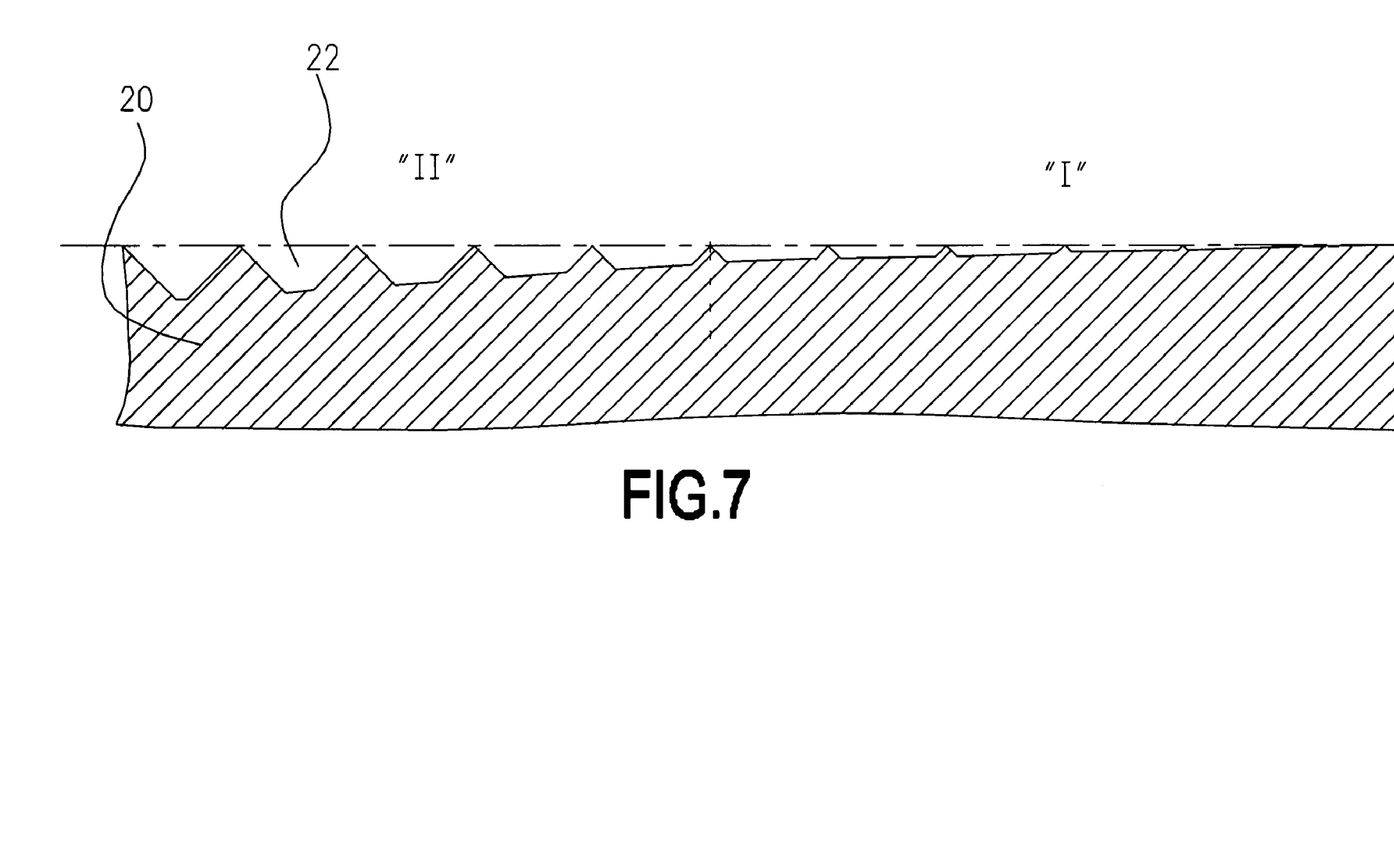
FIG. 7 is a side view of a light-scattering pattern of a light-scattering/light-emission surface according to an embodiment of the present invention.

Refer to FIG. 6 and FIG. 7, which are side views of a light-scattering pattern of a light-scattering/light-emission surface according to an embodiment of the present invention.

In order to improve intensity and increase uniformity, in some embodiments the light-scattering/light-emission plane 22 is sloped and notched. The present invention forms the notches on the surface of the light-scattering/light-emission surface 22. If the notches are formed on the reflective plane, the light is output after being reflected and refracted in the light guide body. Although this can also improve the uniformity, the residual notch or indentation shadow will be obvious after exceeding a certain range. Therefore, it is preferred to form the notches on the light-scattering/light-emission surface. As a result, the present invention not only reduces the influence or shadow of the indentations or notches but also improves the uniformity. The light is reflected and refracted by the reflective surfaces of the light guide bar and the reflective housing, and then output from the light-scattering/light-emission surface. With different notch angles, the light can be controlled more uniformly. Because the light is directly output after being uniformed, the indentation shadow is not obvious, and the effective focal range tolerance of the light can also be improved when combined with the reflective flange.

In the present invention, the design of the notches or indentations is closely related to the light uniformity. The incline angle (£K) of the notch is typically between 0.03 to 0.15 degrees, and the angle can be gradually or sectionally increased. For example as shown in FIG. 7, the incline angle of section I is a fixed value between 0.03 to 0.09 degrees (such as 0.07), and the incline angle of section II is a fixed value between 0.09 to 0.15 degrees (such as 0.11). If illustrated by increasing the incline angle over 3 sections, the incline angle of section I could be a fixed value between 0.03 to 0.05 degrees (such as 0.04), the angle of section II could be fixed value between 0.05 to 0.10 degrees (such as 0.08), and the angle of section III could be a fixed value between 0.10 to 0.15 degrees (such as 0.12). Obviously, other angles of incline can be utilized depending on requirements. For example, the incline angle can be linearly or logarithmically increased from one end to the other.

Following is a method for calculating the height and the incline length of the notches or indentations formed in the light-scattering/light-emission surface, as shown in FIG. 6. Assume the section has the same incline angle (£K), L is the total length of the concentrated effective focal range of the LED in this section, the distance between the bottoms of each notch are the same, N is the length from the calculated indentation to the concentrated focus of the LED (typically between 1–111), and the angle of the indent is £p (typically between 30 to 40 degrees).

So, the height of the 1st indent X1$_i$×(L−N1)*tan £K the height of the 2nd indent X2$_i$×(L−N2)*tan £K  (1)

and, the incline length of the 1st indent Y1$_i$×X1/sin £p1 the incline length of the 2nd indent Y2$_i$×X2/sin £p2  (2)

In equations (1) and (2), the height of the indent can be calculated and then the incline length of the indent can be also obtained. By using different values of N and £p, the incline length of the indent can be changed to control the light refractive index and reflecting index.

Figure 8:
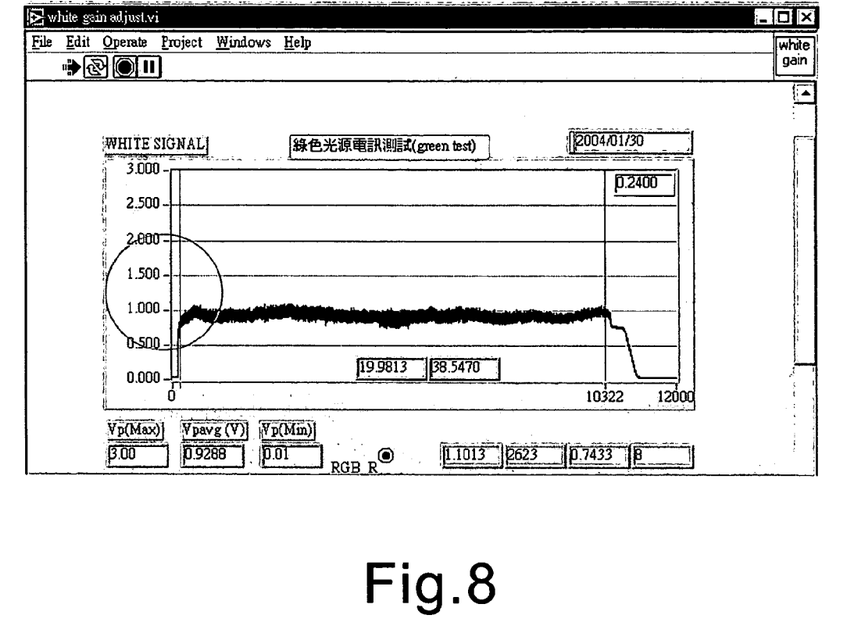
FIG. 8 is a graph illustrating testing results of intensity without a reflecting flange according to an embodiment of the present invention.
Figure 9:
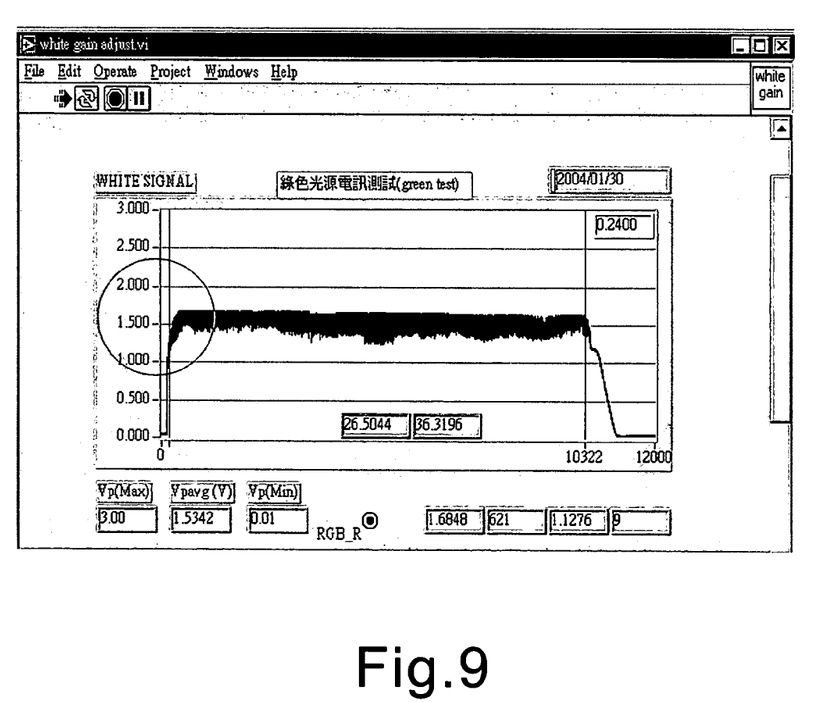
FIG. 9 is a graph illustrating testing results of intensity with a reflecting flange according to and embodiment of the present invention.

Refer to FIG. 8, which is a graph illustrating testing results of intensity without a reflective flange and FIG. 9, which is a graph illustrating testing results of intensity with a reflective flange according to and embodiment of the present invention.

With the same green light source, and input duty of 0.24, the output intensity without the reflecting flange is about 0.9288V, and with the reflecting flange the output intensity can be raised to 1.5432V. This proves that the present invention can effectively improve the light output intensity by adding the reflecting flange. Combined with the notched light-scattering/light-emission surface, a light with high intensity and uniformity can be obtained, and the beaming light effective focal range tolerance can be also enlarged. In application, an image output with greater quality and resolution can be accomplished.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A light guide assembly for enhancing uniformity of beaming light, comprising:
   a light guide bar comprising a light-emission surface and a plurality of reflecting surfaces, wherein the light-emission surface is sloped and comprises a plurality of notches;
   a light source assembly connecting to the light guide bar, the light source assembly comprising at least one light emitting diode; and
   a reflective housing encasing a portion of the light guide bar, and a reflecting flange on the reflective housing for reflecting light emitted from the light-emission surface.

2. The light guide assembly for enhancing uniformity of beaming light of claim 1, the light source assembly further comprising a base with an opening corresponding to a shape of the light guide bar for connecting the light guide bar and the light source assembly.

3. The light guide assembly for enhancing uniformity of beaming light of claim 1, wherein the light emitting diode comprises at least one green light emitting diode, at least one red light emitting diode and at least one blue light emitting diode.

4. The light guide assembly for enhancing uniformity of beaming light of claim 2, wherein the light emitting diode is positioned 1.12±0.1 centimeters in a diametrical range outward a center of the base opening.

5. The light guide assembly for enhancing uniformity of beaming light of claim 1, wherein the notches and incline are formed on an outer surface of the emission plane.

6. The light guide assembly for enhancing uniformity of beaming light of claim 1, wherein the reflective housing comprises an upper section and a lower section, wherein the upper and lower sections can be combined together.

7. The light guide assembly for enhancing uniformity of beaming light of claim 1, wherein an angle between the reflecting flange and a vertical axis of the emission opening is 30 to 60 degrees.

8. The light guide assembly for enhancing uniformity of beaming light of claim 5, wherein an angle of the notched surface is gradually increased with an incline angle of 0.03 to 0.15 degrees.

9. The light guide assembly for enhancing uniformity of beaming light of claim 5, wherein an incline angle of the notched plane is gradually and segmentally increased.

10. The light guide assembly for enhancing uniformity of beaming light of claim 1, wherein a color of the reflective housing is selected from one of white, silvery-white and silver.

11. A light guide assembly for enhancing uniformity of beaming light, comprising:
a polygonal light guide bar, wherein one surface of the light guide bar is an emission surface and other surfaces are a plurality of reflecting surfaces, at least one end of the light guide bar is a light-receiving end, wherein the emission plane comprises an inclined and indented surface;
a light source assembly connecting to said light guide bar, wherein the light source assembly comprises at least one light emitting diode; and
a reflective housing encasing the light guide bar, an opening is formed in the reflective housing corresponding to the emission surface and a reflecting flange is formed at one side of the opening.

12. The light guide assembly for enhancing uniformity of beaming light of claim 11, wherein the indented plane comprises notches of more than one depth.

13. The light guide assembly for enhancing uniformity of beaming light of claim 11, wherein a base opening is formed in the light source assembly corresponding to a shape of the light guide bar for connecting the light guide bar and the light source assembly.

14. The light guide assembly for enhancing uniformity of beaming light of claim 11, wherein the light emitting diode comprises at least one green light emitting diode, at least one red light emitting diode and at least one blue light emitting diode.

15. The light guide assembly for enhancing uniformity of beaming light of claim 13, wherein the light emitting diode is placed at a distance of 1.12±0.1 centimeters in a diameter range outward of a center of the base opening.

16. The light guide assembly for enhancing uniformity of beaming light of claim 11, wherein the reflective housing further comprises an upper sleeve and a lower sleeve, and the upper and lower sleeves can be combined together.

17. The light guide assembly for enhancing uniformity of beaming light of claim 11, wherein the angle between said reflecting flange and a vertical axis of the opening is 30 to 60 degrees.

18. The light guide assembly for enhancing uniformity of beaming light of claim 12, wherein the angle of the indented plane is gradually increased with an incline angle of 0.03 to 0.15 degrees.

19. The light guide assembly for enhancing uniformity of beaming light of claim 11, wherein a color of the reflective housing is selected from one of white, silvery white and silver.

\* \* \* \* \*